(12) United States Patent
Luo et al.

(10) Patent No.: US 11,974,363 B2
(45) Date of Patent: Apr. 30, 2024

(54) COMMUNICATION METHOD, COMMUNICATION APPARATUS, AND TERMINAL DEVICE

(71) Applicant: HUAWEI TECHNOLOGIES CO., LTD., Guangdong (CN)

(72) Inventors: Haiyan Luo, Shenzhen (CN); Qinghai Zeng, Shanghai (CN); Mingzeng Dai, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 383 days.

(21) Appl. No.: 17/507,384

(22) Filed: Oct. 21, 2021

(65) Prior Publication Data

US 2022/0046756 A1 Feb. 10, 2022

Related U.S. Application Data

(63) Continuation of application No. PCT/CN2020/084346, filed on Apr. 11, 2020.

(30) Foreign Application Priority Data

Apr. 22, 2019 (CN) .......................... 201910325395.5

(51) Int. Cl.
*H04W 88/04* (2009.01)
*H04W 8/00* (2009.01)
*H04W 68/00* (2009.01)
(Continued)

(52) U.S. Cl.
CPC .......... *H04W 88/04* (2013.01); *H04W 8/005* (2013.01); *H04W 68/005* (2013.01); *H04W 72/20* (2023.01)

(58) Field of Classification Search
CPC ... H04W 40/22; H04W 68/005; H04W 8/005; H04W 72/20; H04W 88/04; H04W 76/14; H04W 92/18
See application file for complete search history.

(56) References Cited

U.S. PATENT DOCUMENTS 9,019,981 B1 * 4/2015 Weinstein .............. H04B 1/719
370/469
11,271,699 B1 * 3/2022 Eyuboglu ............ H04B 7/0691
(Continued)

FOREIGN PATENT DOCUMENTS

| CN | 1921436 A | 2/2007 |
|----|-----------|--------|
| CN | 106454992 A | 2/2017 |

(Continued)

OTHER PUBLICATIONS

Oppo, Left issues on PC5-RRC for group-cast. 3GPP TSG-RAN WG2 Meeting #105bis, Xi'an, China, Apr. 8-12, 2019, R2-1903212, 4 pages.
(Continued)

*Primary Examiner* — Brian D Nguyen
(74) *Attorney, Agent, or Firm* — WOMBLE BOND DICKINSON (US) LLP

(57) ABSTRACT

This application provides a communication method, a communication apparatus, and a terminal device. The method includes a first node that receives a first message of a terminal device that requests to associate the terminal device with the first node. The first node obtains information about a second node, where the second node is a group header of an upper layer group in which the terminal device is located. The first node performs data transmission as a relay between the terminal device and the second node. According to a solution provided in this application, the terminal device can perform normal communication.

20 Claims, 10 Drawing Sheets

(51) Int. Cl.
*H04W 72/04* (2023.01)
*H04W 72/20* (2023.01)

(56) References Cited

U.S. PATENT DOCUMENTS

| | | | |
|---|---|---|---|
| 11,838,151 B1* | 12/2023 | Jones | H04L 25/0242 |
| 2017/0142594 A1 | 5/2017 | Zhang | |
| 2021/0258853 A1* | 8/2021 | Wang | H04W 28/0268 |
| 2021/0392538 A1* | 12/2021 | Wang | H04B 7/15528 |
| 2022/0070732 A1* | 3/2022 | Wang | H04W 40/02 |
| 2022/0070972 A1* | 3/2022 | Belleschi | H04W 4/08 |
| 2022/0116809 A1* | 4/2022 | Cheng | H04W 76/30 |
| 2022/0132607 A1* | 4/2022 | Yilmaz | H04W 68/02 |

FOREIGN PATENT DOCUMENTS

| | | |
|---|---|---|
| CN | 108141900 A | 6/2018 |
| WO | 2007018766 A2 | 2/2007 |
| WO | 2015018010 A1 | 2/2015 |
| WO | 2018202797 A1 | 11/2018 |

OTHER PUBLICATIONS

Huawei et al: "Solution to dynamic group management", 3GPP Draft; S6-180312,Feb. 26, 2018, XP051409533, total 5 pages.
NTT DOCOMO et al: "Sidelink resource allocation mechanism for NR V2X", 3GPP Draft; R1-1900965,Jan. 20, 2019, XP051593810, total 12 pages.
CATT: "Discussion on physical layer procedures in NR V2X", 3GPP Draft; R1-1812618, Nov. 3, 2018, pp. 1-8, XP051478859.

* cited by examiner

COMMUNICATION METHOD, COMMUNICATION APPARATUS, AND TERMINAL DEVICE

CROSS-REFERENCE TO RELATED APPLICATIONS

This application is a continuation of International Application No. PCT/CN2020/084346, filed on Apr. 11, 2020, which claims priority to Chinese Patent Application No. 201910325395.5, filed on Apr. 22, 2019. The disclosures of the aforementioned applications are hereby incorporated by reference in their entireties.

TECHNICAL FIELD

This application relates to the field of communication technologies, and in particular, to a communication method, a communication apparatus, and a terminal device.

BACKGROUND

Currently, in a wireless communication system, a group header of an upper layer group is considered to be introduced, and the group header of the upper layer group may be considered as an application layer data termination point of a terminal device. When the terminal device moves, the terminal device may move out of a communication range in which the group header of the upper layer group of the terminal device is located. In this case, how to ensure normal communication between the terminal device and the group header of the upper layer group is a problem worth considering.

SUMMARY

This application provides a communication method and device, to ensure normal communication.

According to a first aspect, a communication method is provided. The method includes: A first node receives a first message of a terminal device, where the first message is used to request to associate with the first node; the first node obtains information about a second node, where the second node is a group header of an upper layer group in which the terminal device is located; and the first node performs data transmission as a relay between the terminal device and the second node.

After the terminal device moves out of a communication range in which the group header of the upper layer group of the terminal device is located, the terminal device is associated with the first node, so that after the first node obtains information about the group header of the upper layer group of the terminal device, the first node performs data transmission as a relay between the terminal device and the group header of the upper layer group. In this way, normal communication of the terminal device is ensured.

In a possible embodiment, the first message includes information about the upper layer group in which the terminal device is located; and that the first node obtains information about a second node includes: The first node sends the information about the upper layer group in which the terminal device is located to an access network device; and the first node receives the information that is about the second node and that is sent by the access network device.

The first message includes the information about the upper layer group in which the terminal device is located, and the first node obtains, from the access network device by using the information about the upper layer group in which the terminal device is located, the information about the group header of the upper layer group of the terminal device. This can ensure that the first node accurately obtains the information about the upper layer group in which the terminal device is located, and further ensure normal communication of the terminal device.

In a possible embodiment, the method further includes: The first node receives a correspondence between the upper layer group and the group header of the upper layer group; the first message includes information about the upper layer group in which the terminal device is located; and that the first node obtains information about a second node includes: The first node determines the information about the second node based on the correspondence between the upper layer group and the group header of the upper layer group.

The first node obtains the correspondence between the upper layer group and the group header of the upper layer group, and after receiving the first message, the first node may immediately obtain the information about the group header of the upper layer group of the terminal device. This can ensure that the first node quickly and accurately obtains the information about the upper layer group in which the terminal device is located, and further ensure normal communication of the terminal device.

In a possible embodiment, the first message includes the information about the second node; and that the first node obtains information about a second node includes: The first node obtains the information about the second node based on the first message.

The first message includes the information about the second node, so that the first node can directly obtain the information about the upper layer group in which the terminal device is located, and normal communication of the terminal device can be ensured.

In a possible embodiment, the first message includes an identifier of the terminal device; and that the first node obtains information about a second node includes: The first node sends the identifier of the terminal device to an access network device; and the first node receives the information that is about the second node and that is sent by the access network device.

The first message includes the identifier of the terminal device, and the first node obtains, from the access network device by using information about the terminal device, the information about the group header of the upper layer group of the terminal device. This can ensure that the first node accurately obtains the information about the upper layer group in which the terminal device is located, and further ensure normal communication of the terminal device.

In a possible embodiment, before that a first node receives a first message, the method further includes: The first node sends a notification message, where the notification message is used to notify that the first node is a scheduling group header; or the first node sends a sidelink broadcast message, where the broadcast message includes indication information, and the indication information is used to indicate that the first node is a scheduling group header.

The first node notifies that the first node is the scheduling group header by sending the notification message or the sidelink broadcast message. In this way, the terminal device may discover in time that the first node is the scheduling group header. Further, the first node may be used as the relay to communicate with the group header of the upper layer group of the terminal device, to further ensure normal communication of the terminal device.

In a possible embodiment, that the first node performs data transmission as a relay between the terminal device and the second node includes: The first node receives data from the second node, where sidelink control information (SCI) corresponding to the data includes a forwarding indication; and the first node sends the data to the terminal device.

The forwarding indication is set in the sidelink control information (SCI) corresponding to the data, so that the first node can determine that forwarding is required without parsing a destination (DST) field in a media access control (MAC) header of the data, and the first node can determine that the data needs to be forwarded without performing additional processing. This saves time and improves a processing capability.

In a possible embodiment, the SCI further includes information about a delay budget, and that the first node sends the data to the terminal device includes: The first node sends the data to the terminal device within the delay budget.

The delay budget is set, so that the first node may send the data to the terminal device within the delay budget. This avoids a delay in data transmission, and further ensures normal communication.

In a possible embodiment, that the first node performs data transmission as a relay between the terminal device and the second node includes: The first node receives data from the terminal device, where sidelink control information (SCI) corresponding to the data includes a forwarding indication; and the first node sends the data to the second node.

In a possible embodiment, the SCI further includes information about a delay budget, and that the first node sends the data to the second node includes: The first node sends the data to the second node within the delay budget.

In a possible embodiment, that a first node receives a first message of a terminal device includes: The first node receives the first message of the terminal device through a sidelink.

In a possible embodiment, the sidelink control information includes quality of service (QoS) information of the data.

According to a second aspect, a communication method is provided. The method includes: A terminal device receives a notification message sent by a first node, where the notification message is used to indicate that the first node is a scheduling group header; the terminal device sends a first message to the first node, where the first message is used to request to associate with the first node; and the terminal device performs data transmission with a second node through the first node, where the second node is a group header of an upper layer group in which the terminal device is located.

After receiving the notification message, the terminal device learns that the first node is the scheduling group header, so that the terminal device can be associated with the first node, and perform data transmission with the second node through the first node. This can ensure normal communication of the terminal device.

In a possible embodiment, the notification message includes information about an upper layer group in which the first node is located; and that the terminal device sends a first message to the first node includes: When the upper layer group in which the first node is located is different from the upper layer group in which the terminal device is located, the terminal device sends the first message to the first node.

When the upper layer group in which the first node is located is different from the upper layer group in which the terminal device is located, the terminal device sends the first message to the first node. In this way, the terminal device can be associated with the first node, and further perform data transmission with the second node through the first node. This ensures normal communication of the terminal device.

In a possible embodiment, the first message includes information about the upper layer group in which the terminal device is located, information about the second node, or an identifier of the terminal device.

According to a third aspect, a communication method is provided. An access network device receives a radio resource control (RRC) message from a first node, where the RRC message includes at least one of the following: an identifier of a terminal device or information about an upper layer group in which the terminal device is located; and the access network device sends information about a second node to the first node, where the second node is a group header of the upper layer group in which the terminal device is located.

The first node communicates with the access network device, so that the first node accurately obtains information about the group header of the upper layer group of the terminal device. In this way, the first node can perform data transmission as a relay between the terminal device and the group header of the upper layer group. This ensures normal communication of the terminal device.

In a possible embodiment, the method further includes: The access network device sends a notification message to the second node, where the notification message includes the identifier of the terminal device and information about the first node.

The access network device sends the notification message to the second node, so that the second node can learn that the first node can serve as a relay between the second node and the terminal device. In this way, the second node can better communicate with the terminal device through the first node.

In a possible embodiment, the notification message further includes indication information, where the indication information is used to indicate that the terminal device is in a scheduling group of the first node, or the indication information is used to indicate that the first node is the relay between the terminal device and the second node.

According to a fourth aspect, a communication method is provided. The method includes: A second node receives a notification message, where the notification message is used to notify that a first node is a relay between the second node and a terminal device; and the second node communicates with the terminal device through the first node.

The second node receives the notification message, so that the second node can learn that the first node can serve as the relay between the second node and the terminal device. In this way, the second node can better communicate with the terminal device through the first node.

In a possible embodiment, that the second node communicates with the terminal device through the first node includes:

The second node sends data to the terminal device on a sidelink, where sidelink control information (SCI) corresponding to the data includes a forwarding indication.

The sidelink control information (SCI) corresponding to the data includes the forwarding indication, so that the first node can learn, by using the SCI, that the data is forwarded to the terminal, and the first node does not need to further parse the data. This saves processing resources, shortens processing time, and reduces a delay.

In a possible embodiment, the SCI further includes information about a delay budget (delay budget).

According to a fifth aspect, a communication method is provided. The method includes: When a first node is associated with a terminal device, the first node receives data from a second node, where a destination (DST) of the data is the terminal device; and the first node sends the data to the terminal device. For example, the first node discovers that the DST of the data is the terminal device by reading a source (SRC) and the destination (DST) in a media access control (MAC) header of the data.

According to a sixth aspect, a communication method is provided. The method includes: When a first node is associated with a terminal device, the first node receives data from the terminal device, where a destination (DST) of the data is a second node; and the first node sends the data to the second node. For example, the first node discovers that the DST of the data is the second node by reading a source (SRC) and the destination (DST) in a media access control (MAC) header of the data.

According to a seventh aspect, a communication apparatus is provided. The apparatus includes: a transceiver module, configured to receive a first message of a terminal device, where the first message is used to request to associate with a first node; and a processing module, configured to obtain information about a second node, where the second node is a group header of an upper layer group in which the terminal device is located, where the transceiver module is further configured to send data from the terminal device to the second node, and/or further configured to send data from the second node to the terminal device.

In a possible embodiment, the first message includes information about the upper layer group in which the terminal device is located; and the transceiver module is further configured to: send the information about the upper layer group in which the terminal device is located to an access network device; and receive the information about the second node from the access network device.

In a possible embodiment, the transceiver module is further configured to receive a correspondence between the upper layer group and the group header of the upper layer group; the first message includes information about the upper layer group in which the terminal device is located; and the processing module determines the information about the second node based on the correspondence between the upper layer group and the group header of the upper layer group.

In a possible embodiment, the first message includes the information about the second node; and the processing module obtains the information about the second node based on the first message.

In a possible embodiment, the first message includes an identifier of the terminal device; the transceiver module is further configured to: send the identifier of the terminal device to an access network device; and receive the information that is about the second node and that is sent by the access network device; and the processing module obtains the information about the second node from the transceiver module.

In a possible embodiment, the transceiver module is further configured to send a notification message, where the notification message is used to notify that the first node is a scheduling group header; or configured to send a sidelink broadcast message, where the broadcast message includes indication information, and the indication information is used to indicate that the first node is a scheduling group header.

In a possible embodiment, the transceiver module is further configured to: receive data from the second node, where sidelink control information (SCI) corresponding to the data includes a forwarding indication; and send the data to the terminal device.

In a possible embodiment, the SCI further includes information about a delay budget, and the transceiver module is configured to send the data to the terminal device within the delay budget.

In a possible embodiment, the transceiver module is configured to: receive data from the terminal device, where sidelink control information (SCI) corresponding to the data includes a forwarding indication; and send the data to the second node.

In a possible embodiment, the SCI further includes information about a delay budget, and the transceiver module is configured to send the data to the second node within the delay budget.

In a possible embodiment, the transceiver module receives the first message of the terminal device through a sidelink.

In a possible embodiment, the sidelink control information includes quality of service (QoS) information of the data.

According to an eighth aspect, a terminal device is provided. The terminal device includes: a receiving module, configured to receive a notification message sent by a first node, where the notification message is used to indicate that the first node is a scheduling group header; and a sending module, configured to send a first message to the first node, where the first message is used to request to associate with the first node, where the receiving module is further configured to receive data from a second node through the first node, and/or the sending module is further configured to send data to the second node through the first node, where the second node is a group header of an upper layer group in which the terminal device is located.

In a possible embodiment, the notification message includes information about an upper layer group in which the first node is located; and that the sending module is configured to send the first message to the first node includes: When the upper layer group in which the first node is located is different from the upper layer group in which the terminal device is located, the sending module sends the first message to the first node.

In a possible embodiment, the first message includes information about the upper layer group in which the terminal device is located, information about the second node, or an identifier of the terminal device.

According to a ninth aspect, an access network device is provided. The access network device includes: a receiving module, configured to receive an radio resource control (RRC) message from a first node, where the RRC message includes at least one of the following: an identifier of a terminal device or information about an upper layer group in which the terminal device is located; and a sending module, configured to send information about a second node to the first node, where the second node is a group header of the upper layer group in which the terminal device is located.

In a possible embodiment, the sending module is further configured to send a notification message to the second node, where the notification message includes the identifier of the terminal device and information about the first node.

In a possible embodiment, the notification message further includes indication information, where the indication information is used to indicate that the terminal device is in a scheduling group of the first node, or the indication information is used to indicate that the first node is a relay between the terminal device and the second node.

According to a tenth aspect, a communication apparatus is provided. The apparatus includes: a receiving module, configured to receive a notification message, where the notification message is used to notify that a first node is a relay between a second node and a terminal device; and a sending module, configured to send data from the first node to the terminal device, or configured to send data from the terminal device to the first node.

In a possible embodiment, the sending module is configured to send data to the terminal device on a sidelink, where sidelink control information (SCI) corresponding to the data includes a forwarding indication.

In a possible embodiment, the SCI further includes information about a delay budget.

According to an eleventh aspect, a communication apparatus is provided. The apparatus includes: a receiving module, configured to receive data from a second node, where a destination (DST) of the data is a terminal device; and a sending module, configured to send the data to the terminal device. For example, a first node discovers that the DST of the data is the terminal device by reading a source (SRC) and the destination (DST) in a media access control (MAC) header of the data. The communication apparatus is associated with the terminal device.

According to a twelfth aspect, a communication apparatus is provided. The apparatus includes: a receiving module, configured to receive data from a terminal device, where a destination (DST) of the data is a second node; and a sending module, configured to send the data to the second node. For example, a first node discovers that the DST of the data is the second node by reading a source (SRC) and the destination (DST) in a MAC header of the data.

According to another aspect, a communication apparatus is provided. The apparatus includes a processor, where the processor is connected to a memory, the memory is configured to store computer-executable instructions, and the processor executes the computer-executable instructions stored in the memory, so that the communication apparatus implements the method according to any one of the first aspect to the sixth aspect.

In a possible implementation, the processor includes a logic circuit and an input interface and/or an output interface. The output interface is configured to perform a sending action in a corresponding method, and the input interface is configured to perform a receiving action in a corresponding method.

In a possible implementation, the communication apparatus further includes a communication interface and a communication bus. The processor, the memory, and the communication interface are connected through the communication bus. The communication interface is configured to perform receiving and sending actions in a corresponding method. The communication interface may also be referred to as a transceiver. Optionally, the communication interface includes a transmitter and a receiver. In this case, the transmitter is configured to perform a sending action in a corresponding method, and the receiver is configured to perform a receiving action in a corresponding method.

In a possible implementation, the communication apparatus exists in a product form of a chip.

According to another aspect, a communication system is provided. The communication system includes at least two of the following: the communication apparatus according to the seventh aspect, the access network device according to the ninth aspect, or the communication apparatus according to the tenth aspect.

According to another aspect, an embodiment of this application provides a computer-readable storage medium. The computer-readable storage medium stores instructions; and when the instructions are run on a computer, the computer is enabled to perform the methods according to the foregoing aspects.

According to another aspect, an embodiment of this application provides a computer program product including instructions. When the computer program product runs on a computer, the computer is enabled to perform the methods according to the foregoing aspects.

DESCRIPTION OF EMBODIMENTS

Network architectures and service scenarios described in this application are intended to describe technical solutions in this application clearly, but are not intended to limit the technical solutions provided in this application. A person of ordinary skill in the art may learn that as the network architectures evolve and a new service scenario emerges, the technical solutions provided in this application are also applicable to a similar technical problem.

Figure 1:
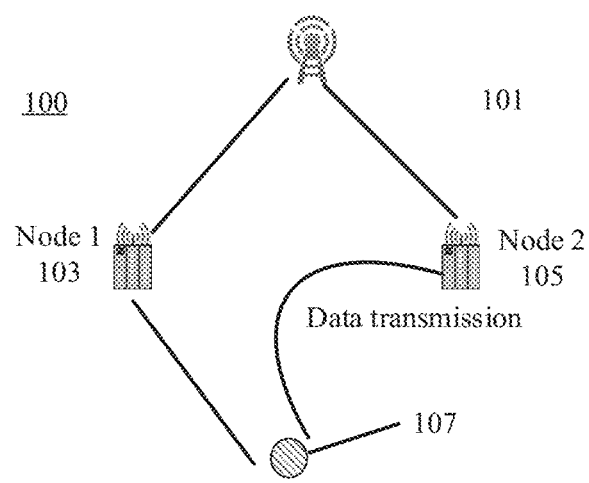
FIG. 1 is a schematic diagram of a network architecture of a communication system.

FIG. 1 is a schematic diagram of a network architecture of a communication system. As shown in FIG. 1, a wireless communication system 100 includes a radio access network device 101, a first node 103, and a second node 105. The radio access network device 101 and the first node 103 communicate with each other. The radio access network device 101 and the second node 105 communicate with each other. The first node 103 and the second node 105 each set up a radio resource control (RRC) connection to the radio access network device 101. The first node 103 may be considered as a local manager or a scheduling group header, and the first node is responsible for allocating a sidelink (SL) transmission resource to a terminal device associated with the first node. The second node 105 is a group header of an upper layer group in which a terminal device 107 is located. A relationship between the group header of the upper layer group and a group member may be preconfigured, for example, configured before delivery, or the relationship between the group header of the upper layer group and the group member may be configured by a server. The second node 105 is an application layer data termination point of the terminal device 107. In other words, the terminal device 107 and the second node 105 have peer application layers. The first node 103 and the second node 105 may be considered as special terminal devices. When the terminal device 107 moves out of a communication range of the second node 105 and into a communication range of the first node 103, how to ensure normal communication between the terminal device 107 and the second node is a problem worth considering.

Figure 2:
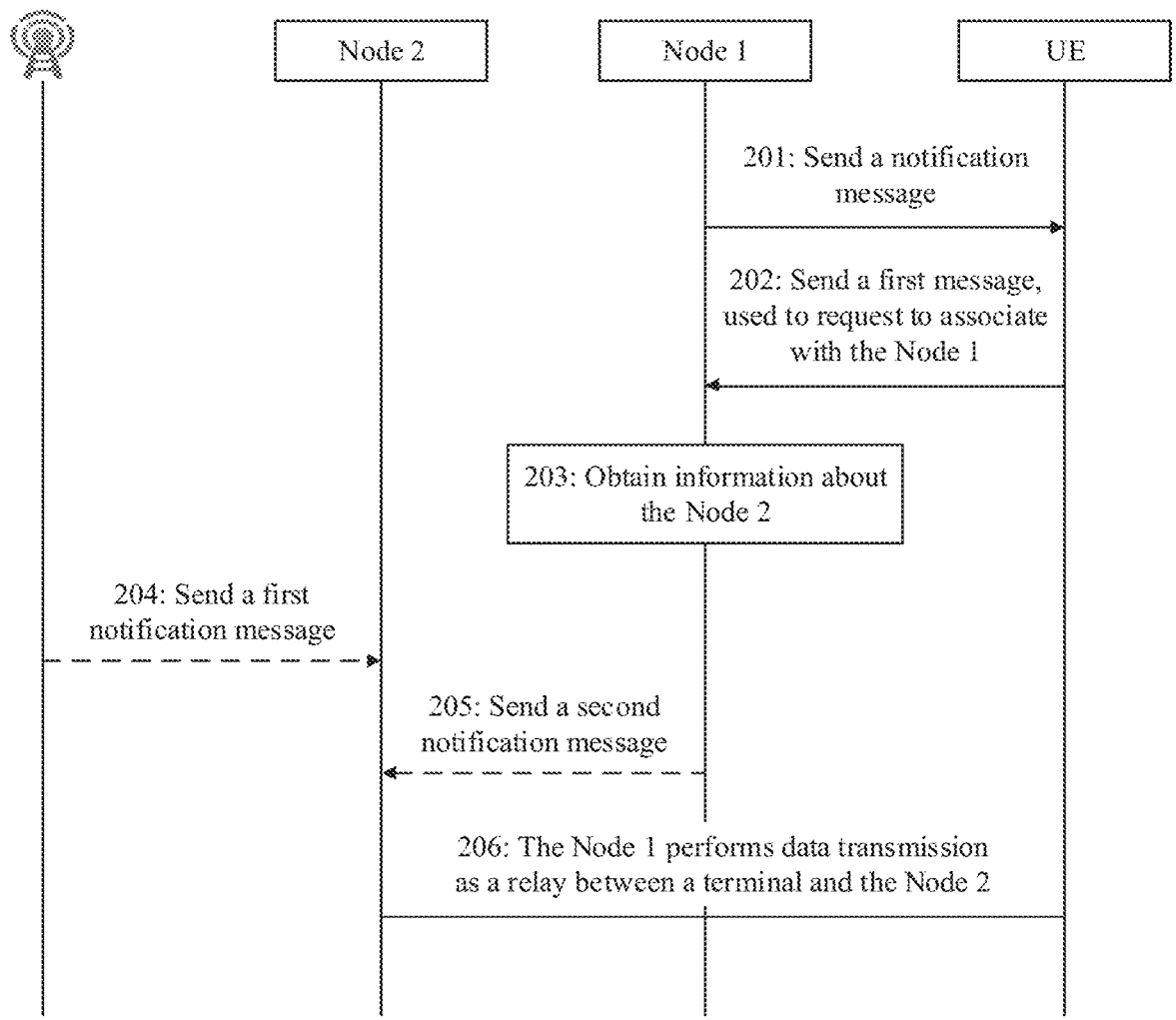
FIG. 2 is a schematic diagram of a communication method according to an embodiment of this application.

FIG. 2 is a schematic diagram of a communication method according to an embodiment of this application. As shown in FIG. 2, the method includes the following operations.

201: A first node Node 1 sends a notification message. The notification message is used to indicate that the first node is a scheduling group header. A possibility is that the notification message includes indication information, and the indication information is used to indicate that the Node 1 is the scheduling group header. Another possibility is that the notification message includes a message type. For example, the message type is a group header notification message. This implicitly indicates that the first node sending the group header notification message is the scheduling group header. The scheduling group header is responsible for scheduling a sidelink transmission resource for a terminal device associated with the scheduling group header. Specifically, the first node Node 1 may send the notification message on a sidelink. The notification message may be a discovery message. The notification message may alternatively be a broadcast message.

The terminal device may receive the notification message. For example, the terminal device performs a search on a sidelink resource, and receives the notification message sent by the Node 1, to learn that the Node 1 is the scheduling group header. Alternatively, an access network device notifies the terminal device in advance of a sending resource pool of the Node 1 (namely, a receiving resource pool of the terminal device). For example, the notification message includes an identifier of the Node 1 and the sending resource pool of the Node 1, and may further include a sending resource pool of the terminal device. Then, the terminal device monitors the sending resource pool of the Node 1, and may receive the notification message sent by the Node 1. Subsequently, the terminal device may send an association request message to a scheduling group header 1 in the sending resource pool of the terminal device.

Optionally, before operation 201, the first node Node 1 may be determined as the scheduling group header. The first node Node 1 may be the scheduling group header by applying to the access network device, or may be the scheduling group header through election performed between terminal devices. For example, the Node 1 notifies the access network device that the Node 1 is a group header of an upper layer group of the first group (i.e., Group 1), and the access network device determines to set the Node 1 as the scheduling group header. Alternatively, the Node 1 notifies the access network device that the Node 1 has a capability of allocating a sidelink transmission resource to another terminal device, and the access network device determines to set the Node 1 as the scheduling group header. After determining to set the first node Node 1 as the scheduling group header, the access network device may send a message to the Node 1, and determine that the Node 1 is the scheduling group header. The message sent by the access network device to the first node may further include area information, information about the sending resource pool, information about the receiving resource pool, or the like. A resource pool may include a frequency domain resource including one or more radio resource blocks (RB), or include a time-frequency domain resource including one or more RBs in a specific subframe/slot or a specific subframe/slot set. There may be one or more resource pools on each carrier. The Node 1 may send a message on the sending resource pool.

The area information may be information about a physical area, or may be an area identifier. For example, the physical area may be a circular area, the physical area may be determined based on a central location and a radius length, and the central location may be determined based on a longitude and a latitude. Alternatively, the physical area may be a square area, the physical area may be determined based on a central location, a length, and a width, and the central location may be determined based on a longitude and a latitude. The physical area may alternatively be an area range in another shape, for example, a square, a cellular shape, or an irregular shape. When the area information is the area identifier, the access network device may broadcast a correspondence between the area identifier and the physical area in advance. Optionally, the broadcast message in operation 201 may further include the area information.

202: The terminal device sends a first message to the first node, where the first message is used to request to associate with the first node. The first message may be transmitted on a sidelink.

In an example, the first message may include information about an upper layer group in which the terminal device is located. The information about the upper layer group in which the terminal device is located may include an identifier of the upper layer group in which the terminal device (e.g., a Group ID) is located. The Group ID may be a group identifier defined in the Industrial Internet or a proximity service layer 2 group identifier (ProSe Layer 2 Group ID). The information about the upper layer group may further include an identifier of a group header of the upper layer group in which the terminal device is located. The group header of the upper layer group may be a group header identifier defined in the industrial Internet or a proximity service layer 2 identifier.

The first message may further include information about the terminal device. The information about the terminal device includes an identifier of the terminal device (UE ID)

on a sidelink, for example, may include at least one of the following: a proximity service (ProSe) identifier, a media access control (MAC) address, an internet protocol (IP), or an identifier of another terminal device. The identifier of the terminal device is used to uniquely identify the terminal device on the sidelink.

Figure 3:
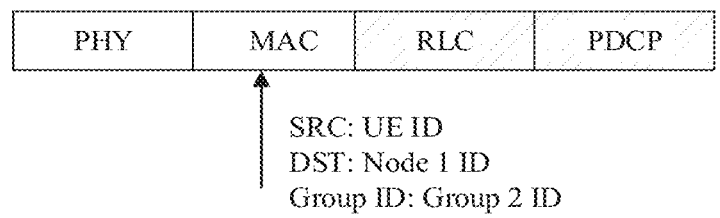
FIG. 3 is a schematic diagram of a first form of a first message.

FIG. 3 is a schematic diagram of a first form of the first message. As shown in FIG. 3, the message includes a physical layer (PHY) header, a MAC header, an RLC header, and a packet data convergence protocol (PDCP) header. Alternatively, the message may not include the PDCP header, or may not include the RLC header or the PDCP header. The RLC header and the PDCP header are schematically represented in slashes in FIG. 3. The UE ID may be located in a source (SRC) field in the MAC header, and the Group ID may be included in another field in the MAC header, for example, a Group field. The MAC header further includes information about the Node 1, for example, a Node 1 ID. The information about the Node 1 may be located in a destination (DST) field in the MAC header.

Figure 4:
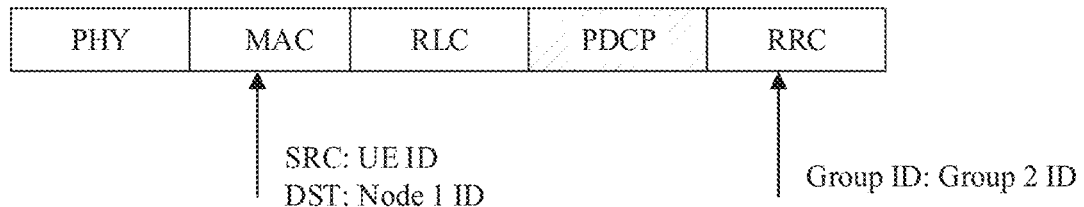
FIG. 4 is a schematic diagram of a second form of a first message.

FIG. 4 is a schematic diagram of a second form of the first message. As shown in FIG. 4, the message includes a PHY header, a MAC header, a radio link control (RLC) header, and a radio resource control (RRC) message. The message may not include the PDCP header. The PDCP header is schematically represented in slashes in FIG. 4. The UE ID may be located in a source (SRC) field in the MAC header. The MAC header may further include information about the Node 1, for example, a Node 1 ID. Similarly, the Node 1 ID may be a group header identifier defined in the Industrial Internet or a proximity service identifier, and the Node 1 ID is used to uniquely identify the node on the sidelink. The information about the Node 1 may be located in a destination (DST) field in the MAC header. The Group ID may be included in a newly added field in the MAC header, or may be included in a field in an RRC message.

Optionally, the first message is an association request message. If the terminal device and the Node 1 have set up a sidelink SL-RRC connection, the terminal device may send the association request message through SL-RRC. For example, the association request message is an SL-RRC message. If the terminal device and the Node 1 have not set up an SL-RRC connection, the terminal device may send the association request message to the Node 1 through a common control channel. This is similar to that UE sends an RRC connection setup request message through a common control channel in a cellular network. Alternatively, the association request message is a MAC layer message. For example, the terminal device adds a message type to a MAC layer of a message that is to be sent to the Node 1, and the message type is the association request message.

203: The first node Node 1 obtains information about a second node Node 2, where the second node is the group header of the upper layer group in which the terminal device is located.

Figure 5:
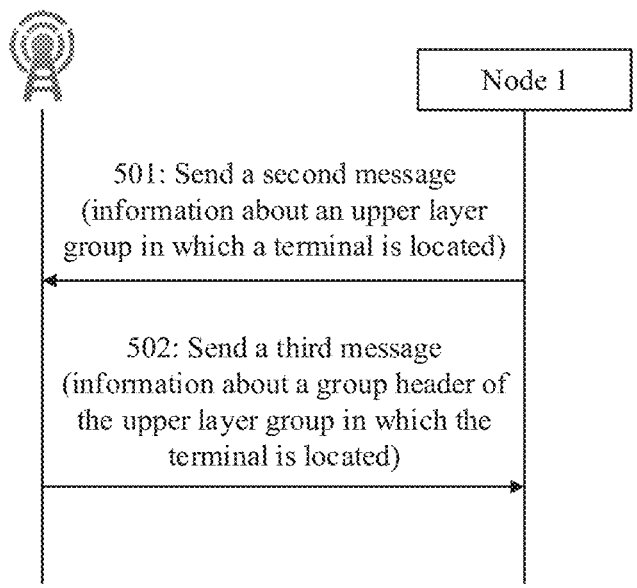
FIG. 5 is a schematic diagram of a first method used by a first node Node 1 to obtain information about a second node Node 2.

FIG. 5 is a schematic diagram of a first method used by a first node Node 1 to obtain information about a second node Node 2. As shown in FIG. 5, the obtaining method may include the following operations.

501: The first node sends a second message to a radio access network device, where the second message includes information about an upper layer group in which a terminal device is located. The radio access network device receives the second message, and determines that a second node is a group header of the upper layer group in which the terminal device is located. The first node may send the second message by using an uplink RRC message.

For example, the second message includes the information about the upper layer group in which the terminal device is located and an identifier of the terminal device UE ID. The radio access network device finds a corresponding group header identifier of the upper layer group based on the information about the upper layer group. For example, when the upper layer group in which the terminal device is located and that is included in the second message is a Group ID 2, the radio access network device finds the corresponding group header identifier of the upper layer group Node 2 ID based on the Group ID 2.

502: The radio access network device sends a third message to the first node, where the third message includes information about the second node. The first node receives the third message. The third message may be a downlink RRC message, for example, an RRC reconfiguration message.

Optionally, the third message further includes information about a receiving resource pool of the Node 2, and may further include information about a sending resource pool of the Node 2. The first node Node 1 may perform sending on the receiving resource pool of the second node Node 2, so that the Node 2 may receive a message or data of the Node 1. After the Node 1 and the Node 2 discover each other, the Node 2 may also send a message or data to the Node 1 on the sending resource pool.

Optionally, the third message further includes a mapping relationship between an SL logical channel identifier (LCID) between the Node 1 and UE and an SL LCID between the Node 1 and the Node 2 (namely, a mapping relationship between two-hop SL LCIDs). For example, an SL LCID=1 between the Node 1 and the UE corresponds to an SL LCID=1 between the Node 1 and the Node 2, and an SL LCID=2 between the Node 1 and the UE corresponds to an SL LCID=2 between the Node 1 and the Node 2. In this way, when receiving data of an LCID x of the second node Node 2, the first node Node 1 may map, with reference to the mapping relationship, the data to an LCID y between the Node 1 and the UE for transmission. When receiving data of an LCID y of the UE, the first node Node 1 may map, with reference to the mapping relationship, the data to an LCID x between the Node 1 and the Node 2 and send the data to the Node 2.

Optionally, the third message further includes a mapping relationship of a proximity packet priority (e.g., a ProSe Per-Packet Priority, also referred to by PPPP) or a quality of service (QoS) parameter. The QoS parameter may include a QoS flow identifier (QFI) of a data flow, and a QoS parameter corresponding to the QoS flow. In this way, when the Node 1 receives data from the Node 2 or the UE, the Node 1 finds a corresponding SL LCID based on the PPPP or QoS for transmission. After receiving the foregoing information, the Node 1 may further notify the UE (for example, the Node 1 sends a sidelink RRC message to the UE) of a mapping relationship between the PPPP or the QoS and the SL LCID between the Node 1 and the UE. Alternatively, a base station sends an RRC reconfiguration message to the UE through a relay of the Node 1, and the RRC reconfiguration message includes the mapping relationship between the PPPP or the QoS and the SL LCID between the Node 1 and the UE. When the UE subsequently has data to be sent to the Node 2, the UE finds a corresponding SL logical channel for transmission based on the mapping relationship between the PPPP or the QoS and the SL LCID, that is, finds the corresponding SL logical channel, and sends the data to the Node 1.

In operation 501, the second message may further include information about the terminal device, for example, the identifier of the terminal device. If the second message includes the information about the terminal device, the communication method shown in FIG. 2 may further include operation 204: The radio access network device sends a first notification message to the Node 2, where the first notification message may be an RRC reconfiguration message. The RRC reconfiguration message includes the identifier of the terminal device UE ID on the sidelink and an identifier of the Node 1 Node 1 ID on the sidelink. Optionally, the RRC reconfiguration message may further include a first indication. The first indication is used to notify the second node Node 2 that the first node Node 1 can serve as a relay between the terminal device and the second node Node 2. Alternatively, the first notification information may be used to notify the second node Node 2 that the terminal device is located in an area in which the first node Node 1 is responsible for scheduling. Alternatively, the first notification information may be used to notify the second node Node 2 that the terminal device is in a scheduling group of the first node Node 1. The notification may alternatively be implicit. In other words, the notification does not include the first indication. For example, if the RRC reconfiguration message includes a scheduling group header identifier (SchedulingGroupHeaderID) information element, and a value of the information element is the identifier of the Node 1 on the sidelink, the second node may learn that the first node Node 1 is a scheduling group header, and may implicitly learn that the first node Node 1 can serve as the relay between the terminal device and the second node Node 2. If operation 204 is not performed, the communication method shown in FIG. 2 may further include operation 205: The Node 1 sends a second notification message to the Node 2 on the sidelink, where the second notification message includes the identifier of the terminal device on the sidelink and a second indication. The second indication is used to notify that the Node 1 can serve as the relay between the terminal device and the Node 2, the terminal device is in the scheduling group of the Node 1, or the terminal device is in the area in which the Node 1 is responsible for scheduling. The second notification message may alternatively be implicit. In other words, the second notification message does not include the second indication. For example, a type of the second notification message is SchedulingHeaderIndication. The message type is used to replace the second indication. The identifier of the Node 1 on the sidelink is included in a source field in a MAC header of the notification message 2 sent by the Node 1 to the Node 2.

Optionally, the first notification message or the second notification message further includes information about a sending resource pool of the Node 1, and may further include information about a receiving resource pool.

Optionally, the first notification message or the second notification message further includes the mapping relationship between the SL LCID between the Node 1 and the Node 2 and the corresponding PPPP or QoS parameter. After receiving the foregoing information, the Node 2 subsequently finds the corresponding SL logical channel between the Node 1 and the Node 2 based on the mapping relationship between the PPPP of the data and the SL LCID or the mapping relationship between the QoS parameter of the data and the SL LCID for transmission.

The communication method in FIG. 2 may further include operation 206: The Node 1 performs data transmission as the relay between the terminal device and the Node 2.

In a first possible manner, operation 206 may specifically include the following operation: The Node 2 sends data on the sidelink, and the Node 1 receives the data. The SRC included in the MAC header of the data is the Node 2 ID, and the DST is the UE D. After reading the SRC and the DST in the MAC header, the Node 1 learns that the data is sent by the Node 2 to the UE. The Node 1 forwards the data to the UE without changing the SRC and the DST in the MAC header.

In a second possible manner, operation 206 may specifically include the following operation: The Node 2 sends data on the sidelink, and the Node 1 receives the data. The SRC included in the MAC header of the data is the Node 2 ID, and the DST is the UE ID. Sidelink control information (SCI) corresponding to the data includes a forwarding indication. The Node 1 only needs to parse the SCI. After discovering the forwarding indication, the Node 1 does not need to parse a MAC header included in subsequently sent data, directly forwards the data, and does not change an SRC and a DST in the MAC header during forwarding. The forwarding indication may also be referred to as a relay indication. The forwarding indication may also be a flag allocated by the Node 1 to the UE. The SCI may further include information about a delay budget, and the Node 1 sends the data to the UE within the delay budget.

Figure 6:
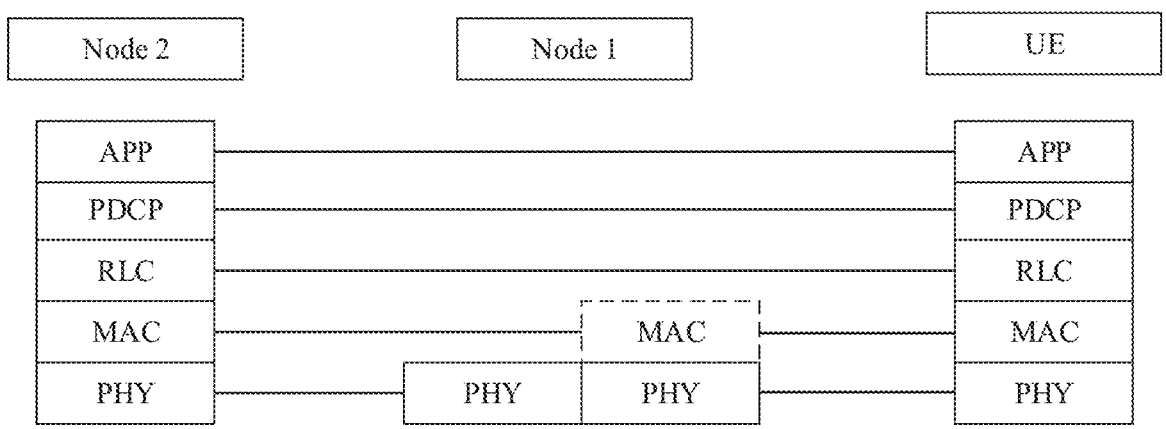
FIG. 6 is a schematic diagram of user plane protocol stacks of a Node 2, a Node 1, and UE.

FIG. 6 is a schematic diagram of user plane protocol stacks of a Node 2, a Node 1, and UE. The Node 2 and the UE have peer APP, PDCP, RLC, and MAC layers. In other words, data at the MAC layer and layers above the MAC layer is transparently transmitted through the Node 1. In a first possible manner, the Node 1 reads an SRC and a DST in a MAC header of data, to determine whether forwarding is required. For example, when the Node 2 is a transmit end, the Node 1 may further read an SL LCID in the MAC header of the data, an identifier of the Node 2 Node 2 ID on a sidelink, and an identifier of a terminal device UE ID on the sidelink, and then finds a corresponding next-hop SL LCD (namely, an SL LCD between the Node 1 and the UE) based on a mapping relationship between two-hop SL LCIDs allocated by a base station to the terminal device and the Node 2, to send the data to the UE. Conversely, when the UE is a transmit end, the Node 1 performs similar processing. There is another possibility. The base station does not allocate a mapping relationship between two-hop SL LCIDs to the Node 1, and does not need to notify the Node 1 of a group header of an upper layer group Node 2 corresponding to the UE. The Node 1 directly reads the SRC and the DST in the MAC header, and discovers that the DST in a packet header sent by the Node 2 is the UE. Because the UE is associated with the Node 1, the Node 1 helps the Node 2 forward the data to the UE. In a second possible manner, the Node 1 may read a PPPP in SCI, and find a corresponding SL LCID based on a mapping relationship that is between the PPPP and the SL LCD and that is allocated by the base station. If the SCI includes a QFI, the Node 1 may further find a corresponding SL LCD based on a mapping relationship that is between the QFI and the SL LCD and that is allocated by the base station. Optionally, the SCI may further include a new transmission indication or a retransmission indication, a time interval between initial transmission and retransmission, and a resource location used for initial transmission or retransmission.

Figure 7:
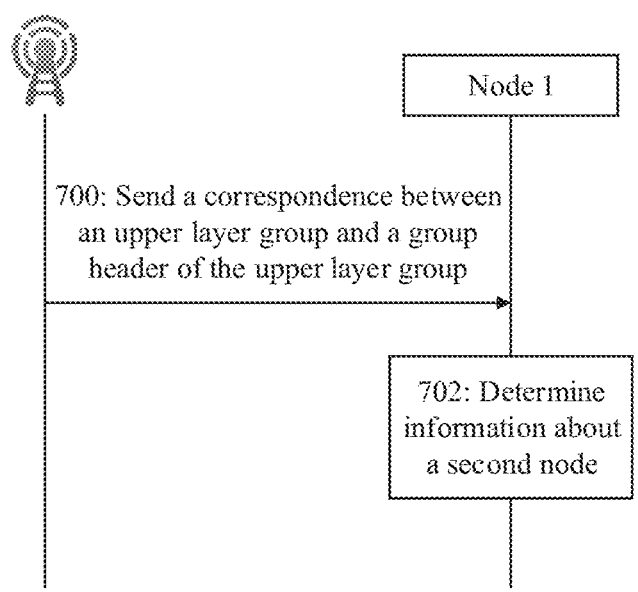
FIG. 7 is a schematic flowchart of a second method used by a first node Node 1 to obtain information about a second node Node 2.

FIG. 7 is a schematic flowchart of a second method used by a first node Node 1 to obtain information about a second node Node 2. As shown in FIG. 7, the obtaining method may include the following operations.

702: The first node determines information about the second node based on a correspondence between an upper layer group and a group header of the upper layer group. Before operation 702, the method may further include operation 700: The first node receives the correspondence between the upper layer group and the group header of the upper layer group. The first node may receive the correspondence from a radio access network device. Alternatively, the first node may receive the correspondence from a group header of an adjacent upper layer group.

Optionally, in the communication method shown in FIG. 2, before operation 201, the Node 2 accesses a cellular network as UE. An access network device may be notified that the Node 2 is a group header of an upper layer group of a Group 2. A possible notification manner is as follows: An uplink RRC message sent by the Node 2 to the access network device includes an identifier of the Node 2, a group identifier, and a group header indication of the upper layer group. The identifier of the Node 2 includes a proximity service enable (ProSe) terminal device identifier (ProSe UE ID), a MAC address, an IP address, or another UE identifier. The group identifier may be a ProSe layer 2 group ID. The uplink RRC message may further include an identifier of a group member, for example, a ProSe UE ID of the group member. Another possible notification manner is as follows: After the Node 2 sets up a connection to a core network through the access network device, the core network determines, through an authentication and certification process, that the Node 2 is a group header of an upper layer group, and the core network device (for example, an MME in an LTE system or an AMF in an NR system) notifies the access network device that the Node 2 is a group header of an upper layer group. For example, a message sent by the core network device to the access network device includes a Node 2 ID, a Group ID, and a group header indication. The message may be a message of an Si interface between an eNB and an MIME, a message of an NG interface between a gNB and an AMF, or an initial context setup request.

Figure 8:
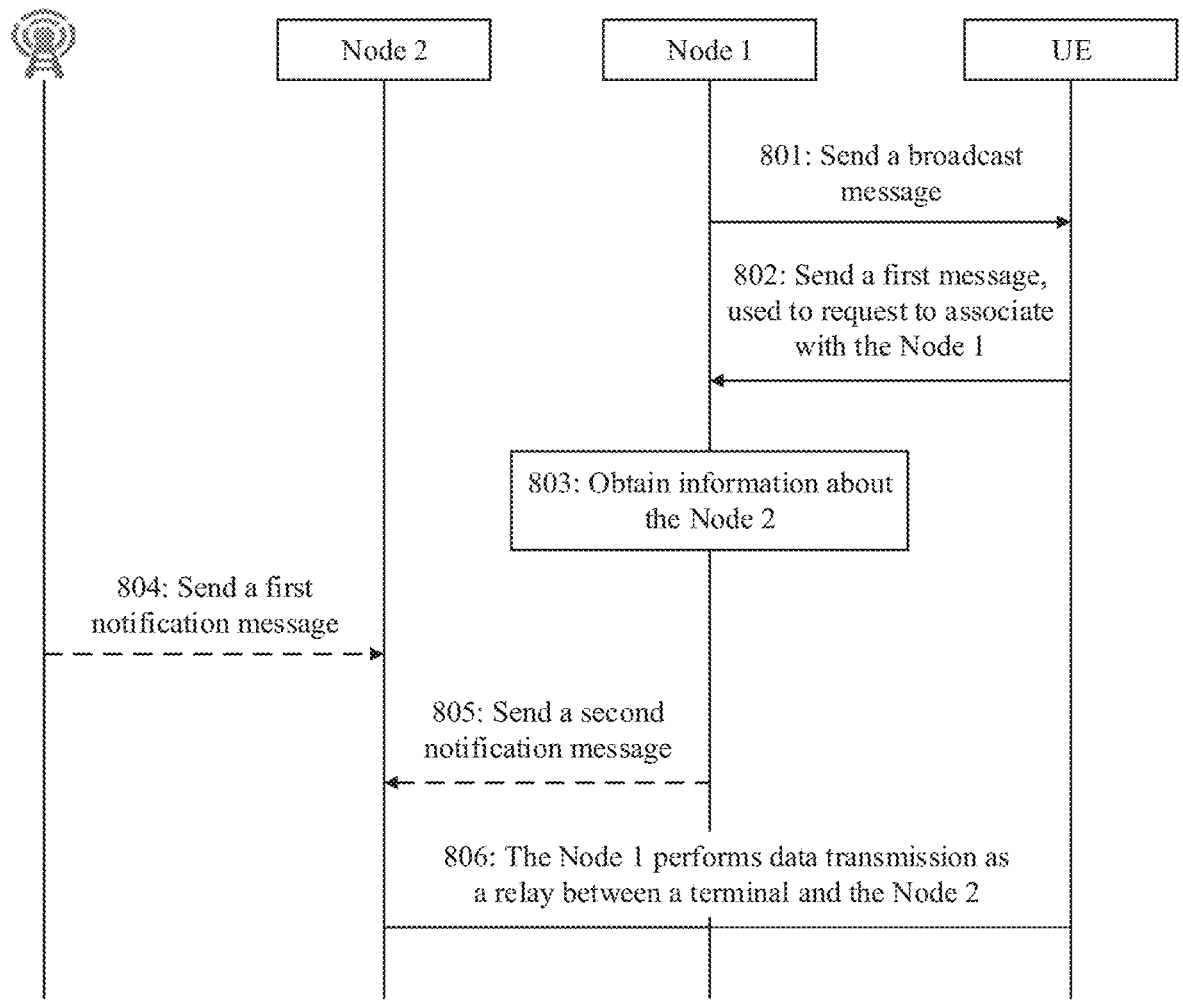
FIG. 8 is a schematic diagram of a communication method according to Embodiment 2 of this patent application.

FIG. 8 is a schematic diagram of a communication method according to Embodiment 2 of this patent application. As shown in FIG. 8, the communication method includes the following operations.

801: A Node 1 broadcasts a group header notification message on a sidelink. A terminal device receives the group header notification message. The notification message further includes information about an upper layer group in which the Node 1 is located, for example, includes a group identifier of the upper layer group in which the Node 1 is located. The message that is broadcast may further include area information or an area identifier. For further descriptions of operation 801, refer to operation 201.

802: The terminal device UE determines whether the upper layer group in which the Node 1 is located and an upper layer group in which the terminal device is located are the same. When the upper layer group in which the Node 1 is located and the upper layer group in which the terminal device is located are the same, the terminal device sends a first message to the Node 1, where the first message is used to request to associate with the first node. The first message does not need to include information about the upper layer group in which the terminal device is located. When the Node 1 discovers that the first message does not include the information about the upper layer group in which the terminal device is located, the Node 1 determines whether to allow association with the terminal device, and does not need to perform operation 803 or the like.

When the upper layer group in which the Node 1 is located is different from the upper layer group in which the terminal device is located, the terminal device continues to search for a scheduling group header of the upper layer group in which the terminal device is located. If no corresponding scheduling group header Node is found within a period of time, the terminal device sends the first message to the Node 1, where the first message is used to request to associate with the first node. The first message includes the information about the upper layer group in which the terminal device is located, for example, an identifier of the upper layer group.

803: When the Node 1 discovers, after receiving the first message, that the message includes the information about the upper layer group in which the terminal device is located, the Node 1 may obtain information about the second node Node 2. For further descriptions of operation 803, refer to operation 203.

One or more of operation 804, 805, or 806 may be performed as required. For operation 804, 805, or 806, refer to operation 204, 205, or 206.

In Embodiment 1 and Embodiment 2, before the terminal device is associated with the Node 1, the terminal device may learn of information (for example, a group identifier or a group header identifier) about the upper layer group in which the terminal device is located, or may not learn of the information about the upper layer group in which the terminal device is located.

Figure 9:
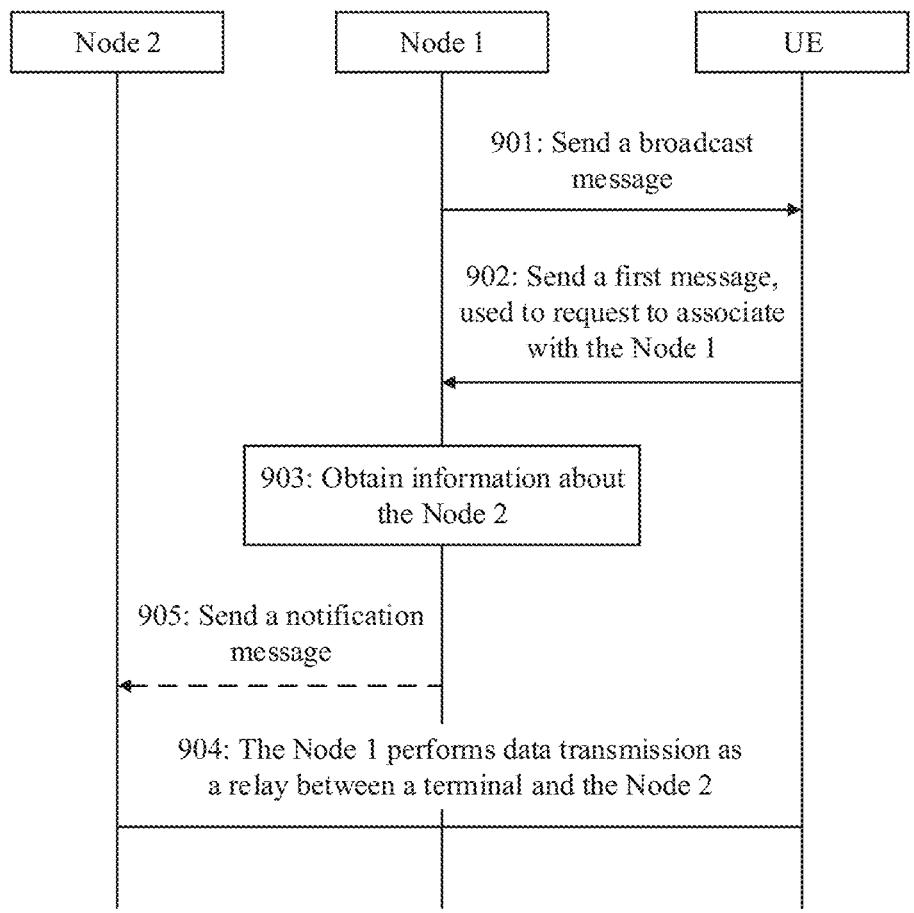
FIG. 9 is a schematic diagram of a communication method according to Embodiment 3 of this patent application.

FIG. 9 is a schematic diagram of a communication method according to Embodiment 3 of this patent application. In Embodiment 3, a terminal device learns of information about a group header of an upper layer group in which the terminal device is located. As shown in FIG. 9, the communication method includes the following operations.

901: A Node 1 broadcasts a group header notification message on a sidelink. The terminal device receives the group header notification message. For further descriptions of operation 901, refer to operation 201.

902: The terminal device sends a first message to the Node 1, where the first message is used to request to associate with the Node 1. The first message includes information about a second node Node 2. The Node 2 is the group header of the upper layer group in which the terminal device is located. Optionally, the first message may further include information (for example, a Group ID) about the upper layer group in which the terminal device is located.

The first message may further include information about the terminal device. The information about the terminal device includes an identifier of the terminal device (UE ID), for example, may include at least one of the following: a proximity service (ProSe) identifier, a media access control (MAC) address, an internet protocol (IP), or an identifier of another terminal device.

A first form of the first message is as follows: A MAC header of the first message includes a UE ID located in an SRC field and a Node 1 ID located in a DST field. The MAC header further includes a Node 2 ID. A second form of the first message is as follows: A MAC header of the first message includes a UE ID located in an SRC field and a Node 2 ID located in a DST field. The MAC header further includes a relay information element Node 1 ID. Optionally, the MAC header further includes a group identifier information element. If UE sends the first message to the Node 1 by using a sidelink RRC message, the MAC header of the first message includes the UE ID located in the SRC field and the Node 1 ID located in the DST field. The first message includes the Node 2 ID. For example, the Node 2 ID may be located in the sidelink RRC message.

903: The Node 1 obtains the information about the Node 2. Specifically, the first node obtains the information about the Node 2 based on the received first message.

904: The Node 1 performs data transmission as a relay between the terminal device and the Node 2. For further descriptions of operation 904, refer to operation 206.

Optionally, the method may further include operation 905.

905: The Node 1 sends a notification message to the Node 2, where the notification message is used to notify that the Node 1 can serve as the relay between the terminal device and the Node 2.

The method in this patent application may be used in vehicle-to-everything (V2X). For example, in vehicle-to-everything, a plurality of vehicles may form a vehicle platoon. In the vehicle platoon, a vehicle 2 is responsible for management of an upper layer group. An application layer data termination point of a vehicle 3 in the vehicle platoon is at the vehicle 2. An access network device specifies that a vehicle 1 is responsible for scheduling another vehicle in an area A. When the vehicle 3 moves into the area A, it is also necessary to ensure normal communication of the vehicle 3. The vehicle 1 may be considered as the first node, the vehicle 2 may be considered as the second node, and the vehicle 3 may be considered as the terminal device.

The method in this patent application may be further used in the Industrial Internet. For example, in the Industrial Internet, a line controller and a machine controller are included. The line controller controls the machine controller, and the machine controller controls the terminal device. The terminal device performs a series of actions under the control of the machine controller. Peer user planes of the machine controller and the terminal device are set up to receive and feed back control command data from the machine controller. For example, the machine controller sends an Ethernet control automation technology (EtherCAT) data packet to a device on the user plane, and the data packet includes a control command for the terminal device. The line controller may be deployed at a location of a radio access network device. The machine controller may be considered as special UE, and can communicate with the line controller through a cellular network air interface (Uu). The machine controller can serve as a local controller to communicate, through a sidelink interface, with the terminal device managed by the machine controller. The terminal device is initially managed by a machine controller 2. If the terminal device moves, when the terminal device moves into a management range of a machine controller 1, the terminal device needs to be associated with the machine controller 1, so that the machine controller 1 is responsible for scheduling. The machine controller 1 may be considered as the first node, the machine controller 2 may be considered as the second node, and the line controller may be considered as the radio access network device.

Figure 10:
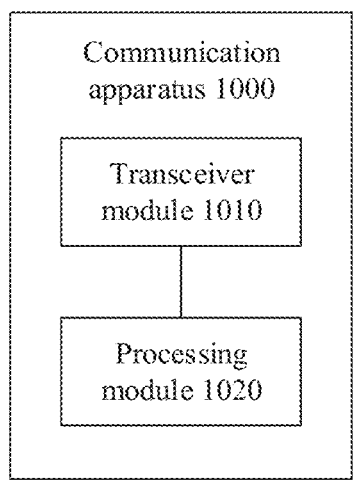
FIG. 10 is a schematic diagram of a communication apparatus according to an embodiment of this application.

FIG. 10 is a schematic diagram of a communication apparatus 1000 according to an embodiment of this application. It should be understood that the communication apparatus 1000 may correspond to the first node in the foregoing method embodiments, and may have a function of the first node in the foregoing method embodiments.

The communication apparatus 1000 includes a transceiver module 1010 and a processing module 1020. The transceiver module 1010 is configured to receive a first message of a terminal device, where the first message is used to request to associate with a first node. The processing module 1020 is configured to obtain information about a second node, where the second node is a group header of an upper layer group in which the terminal device is located. The transceiver module 1010 is further configured to send data from the terminal device to the second node, and/or further configured to send data from the second node to the terminal device.

In an embodiment, the first message includes information about the upper layer group in which the terminal device is located. The transceiver module 1010 is further configured to send the information about the upper layer group in which the terminal device is located to an access network device, and the transceiver module 1010 is further configured to receive the information about the second node sent by the access network device. The processing module 1020 obtains the information about the second node based on the information about the second node received by the transceiver module 1010.

In another embodiment, the transceiver module 1010 is further configured to receive a correspondence between the upper layer group and the group header of the upper layer group. The first message includes the information about the upper layer group in which the terminal device is located. The processing module 1020 is specifically configured to obtain the information about the second node based on the correspondence between the upper layer group and the group header of the upper layer group In another embodiment, the first message includes the information about the second node. That the processing module 1020 is configured to obtain the information about the second node includes: The processing module 1020 is configured to obtain the information about the second node based on the first message.

In another embodiment, the first message includes an identifier of the terminal device. The transceiver module 1010 is further configured to send the identifier of the terminal device to the access network device, and the transceiver module 1010 is further configured to receive the information that is about the second node and that is sent by the access network device. The processing module 1020 obtains the information about the second node based on the information about the second node received by the transceiver module 1010.

Optionally, the transceiver module 1010 is further configured to send a notification message, where the notification message is used to notify that the communication apparatus is a scheduling group header.

Optionally, sidelink control information (SCI) corresponding to the data from the terminal device includes a forwarding indication, and/or sidelink control information (SCI) corresponding to the data from the second node includes a forwarding indication.

Figure 11:
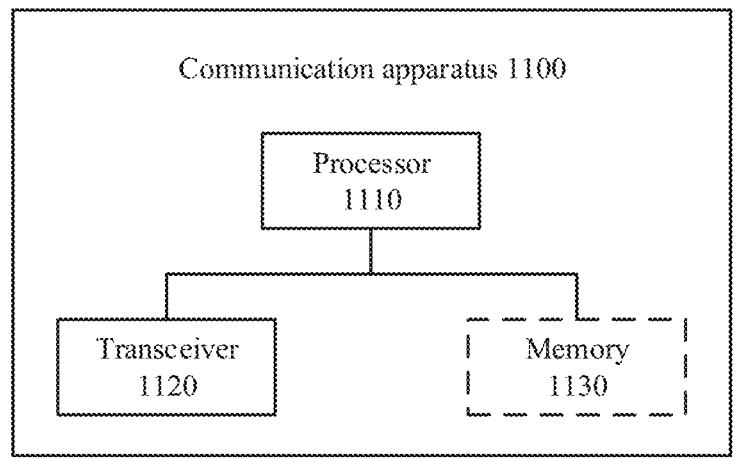
FIG. 11 is a schematic diagram of a communication apparatus according to an embodiment of this application.

FIG. 11 is a schematic diagram of a communication apparatus 1100 according to an embodiment of this application. The communication apparatus 1100 may correspond to the first node in the foregoing method embodiments, and may have a function of the first node in the foregoing method embodiments. The communication apparatus may use a hardware architecture shown in FIG. 11. The communication apparatus may include a processor 1110 and a transceiver 1120. Optionally, the communication apparatus may further include a memory 1130. The processor 1110, the transceiver 1120, and the memory 1130 communicate with each other. A related function implemented by the processing module 1010 in FIG. 10 may be implemented by the processor 1110, and a related function implemented by the transceiver module 1010 may be implemented by the processor 1110 by controlling the transceiver 1120.

Optionally, the processor 1110 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the communication apparatus, execute a software program, and process data of the software program.

Optionally, the processor 1110 may include one or more processors, for example, include one or more central processing units (CPUs). When the processor is one CPU, the CPU may be a single-core CPU, or may be a multi-core CPU.

The transceiver 1120 is configured to: send data and/or a signal, and receive data and/or a signal. The transceiver may include a transmitter and a receiver. The transmitter is configured to send the data and/or the signal, and the receiver is configured to receive the data and/or the signal.

The memory 1130 includes but is not limited to a random access memory (RAM), a read-only memory (ROM), an erasable programmable memory (EPROM), and a compact disc read-only memory (CD-ROM). The memory 1130 is configured to store related instructions and data.

The memory 1130 is configured to store program code and data of a first node, and may be a separate device or integrated into the processor 1110.

Specifically, the processor 1110 is configured to control the transceiver to perform information transmission with a radio access network device or a terminal device. For details, refer to the descriptions in the foregoing method embodiments. Details are not described herein again.

It may be understood that FIG. 11 shows only a simplified design for the communication apparatus. During actual application, the communication apparatus may further include other necessary components, including but not limited to any quantity of transceivers, processors, controllers, memories, and the like, and all terminal devices that can implement this application shall fall within the protection scope of this application.

In a possible embodiment, the communication apparatus 1100 may be a chip, for example, may be a communication chip, and is configured to implement a related function of the processor 1110. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

During specific implementation, in an embodiment, the communication apparatus 1100 may further include an output device and an input device. The output device communicates with the processor 1110, and may display information in a plurality of manners. For example, the output device may be a liquid crystal display (LCD), a light emitting diode (LED) display device, a cathode ray tube (CRT) display device, a projector, or the like. The input device communicates with the processor 1110, and may receive an input from a user in a plurality of manners. For example, the input device may be a mouse, a keyboard, a touchscreen device, a sensing device, or the like.

Figure 12:
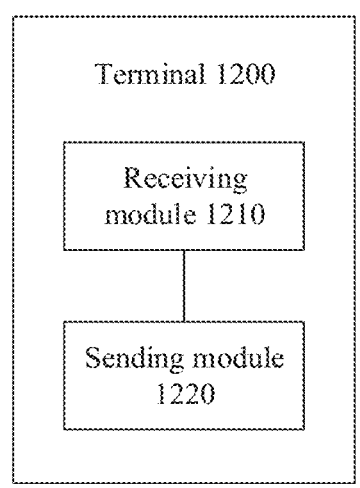
FIG. 12 is a schematic diagram of a terminal device according to an embodiment of this application.

FIG. 12 is a schematic diagram of a terminal device 1200 according to an embodiment of this application. The terminal device 1200 may correspond to the terminal device in the foregoing method embodiments, and may have a function of the terminal device in the foregoing method embodiments. The terminal device 1200 includes a receiving module 1210 and a sending module 1220. The receiving module 1210 is configured to receive a notification message sent by a first node, where the notification message is used to indicate that the first node is a scheduling group header. The sending module 1220 is configured to send a first message to the first node, where the first message is used to request to associate with the first node. The receiving module 1210 is further configured to receive data from a second node through the first node, and/or the sending module 1220 is further configured to send data to the second node through the first node, where the second node is a group header of an upper layer group in which the terminal device 1200 is located.

Optionally, the notification message includes information about an upper layer group in which the first node is located. When the upper layer group in which the first node is located is different from the upper layer group in which the terminal device 1200 is located, the sending module 1220 sends the first message to the first node.

Optionally, the first message includes information about the upper layer group in which the terminal device 1200 is located, information about the second node, or an identifier of the terminal device 1200.

Figure 13:
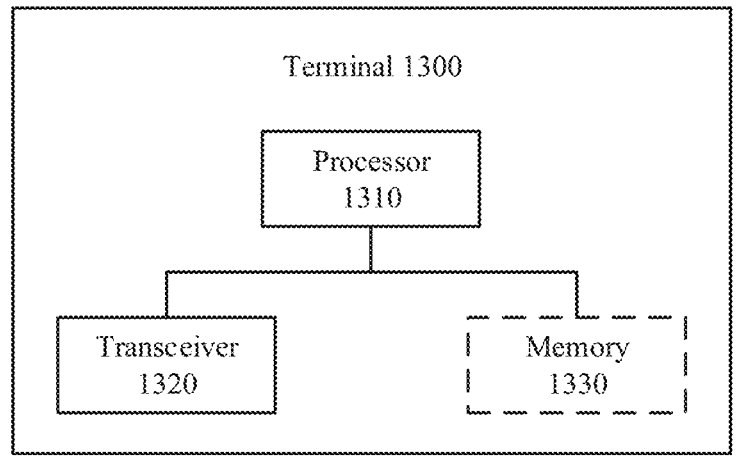
FIG. 13 is a schematic diagram of a terminal device according to an embodiment of this application.

FIG. 13 is a schematic diagram of a terminal device 1300 according to an embodiment of this application. The communication apparatus 1300 may correspond to the terminal device in the foregoing method embodiments, and may have a function of the terminal device in the foregoing method embodiments. The communication apparatus may use a hardware architecture shown in FIG. 13. The communication apparatus may include a processor 1310 and a transceiver 1320. Optionally, the communication apparatus may further include a memory 1330. The processor 1310, the transceiver 1320, and the memory 1330 communicate with each other. The receiving module 1210 and the sending module 1220 in FIG. 12 may be implemented by the processor 1310 controlling the transceiver 1320.

Optionally, the processor 1310 may be a general-purpose central processing unit (CPU), a microprocessor, an application-specific integrated circuit (ASIC), a dedicated processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the communication apparatus, execute a software program, and process data of the software program.

Optionally, the processor 1310 may include one or more processors, for example, include one or more central processing units (CPUs). When the processor is one CPU, the CPU may be a single-core CPU, or may be a multi-core CPU.

The transceiver 1320 is configured to: send and receive data and/or a signal, and receive data and/or a signal. The transceiver may include a transmitter and a receiver. The transmitter is configured to send the data and/or the signal, and the receiver is configured to receive the data and/or the signal.

The memory 1330 includes but is not limited to a random access memory (RAM), a read-only memory (ROM), an erasable programmable memory (EPROM), and a compact disc read-only memory (CD-ROM). The memory 1330 is configured to store related instructions and data.

The memory 1330 is configured to store program code and data of a first node, and may be a separate device or integrated into the processor 1310.

Specifically, the processor 1310 is configured to control the transceiver to perform information transmission with a radio access network device or a terminal device. For details, refer to the descriptions in the foregoing method embodiments. Details are not described herein again.

It may be understood that FIG. 13 shows only a simplified design for the communication apparatus. During actual application, the communication apparatus may further include other necessary components, including but not limited to any quantity of transceivers, processors, controllers, memories, and the like, and all terminal devices that can implement this application shall fall within the protection scope of this application.

In a possible embodiment, the communication apparatus 1300 may be a chip, for example, may be a communication chip, and is configured to implement a related function of the processor 1310. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

During specific implementation, in an embodiment, the communication apparatus 1300 may further include an output device and an input device. The output device communicates with the processor 1310, and may display information in a plurality of manners. For example, the output device may be a liquid crystal display (LCD), a light emitting diode (LED) display device, a cathode ray tube (CRT) display device, a projector, or the like. The input device communicates with the processor 1310, and may receive an input from a user in a plurality of manners. For example, the input device may be a mouse, a keyboard, a touchscreen device, a sensing device, or the like.

It may be understood that FIG. 13 shows only a simplified design of the terminal device. During actual application, the terminal device may further include other necessary components, including but not limited to any quantity of transceivers, processors, controllers, memories, and the like, and all terminal devices that can implement this application shall fall within the protection scope of this application.

In a possible embodiment, the communication apparatus 1300 may be a chip, for example, may be a communication chip that can be used in a terminal device, and is configured to implement a related function of the processor 1310 in the terminal device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

Figure 14:
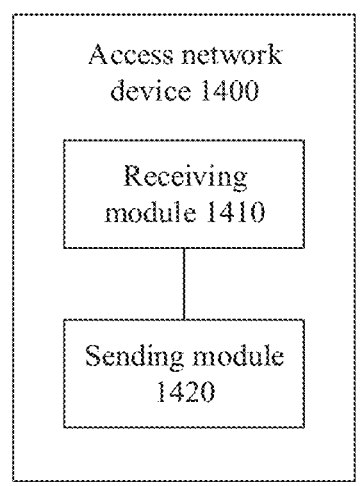
FIG. 14 is a schematic diagram of a radio access network device according to an embodiment of this application.

FIG. 14 is a schematic diagram of an access network device 1400 according to an embodiment of this application. It should be understood that the access network device 1400 may correspond to the access network device in the foregoing method embodiments, and may have a function of the access network device in the foregoing method embodiments.

The access network device 1400 may include a receiving module 1410 and a sending module 1420 that are connected to each other. The receiving module 1410 is configured to receive an RRC message from a first node, where the RRC message includes at least one of the following: an identifier of a terminal device or information about an upper layer group in which the terminal device is located. The sending module 1420 is configured to send information about a second node to the first node, where the second node is a group header of the upper layer group in which the terminal device is located.

In a possible embodiment, the sending module 1420 is further configured to send a notification message to the second node, where the notification message includes the identifier of the terminal device and information about the first node.

In a possible embodiment, the notification message further includes indication information, where the indication information is used to indicate that the terminal device is in a scheduling group of the first node, or the indication information is used to indicate that the first node is a relay between the terminal device and the second node.

Figure 15:
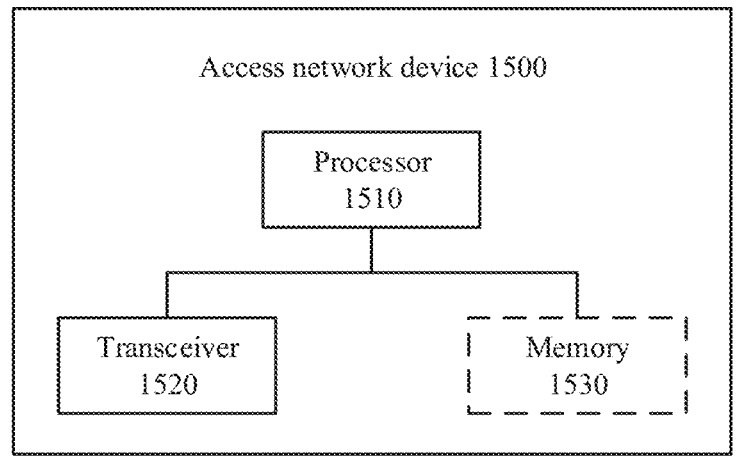
FIG. 15 is a schematic diagram of a radio access network device according to an embodiment of this application.

FIG. 15 is a schematic diagram of a communication apparatus 1500 according to an embodiment of this application. The communication apparatus 1500 may correspond to the access network device in the foregoing method embodiments, and may have a function of the access network device in the foregoing method embodiments. The communication apparatus may use a hardware architecture shown in FIG. 15. The communication apparatus may include a processor 1510 and a transceiver 1520. Optionally, the communication apparatus may further include a memory 1530. The processor 1510, the transceiver 1520, and the memory 1530 communicate with each other. The receiving module 1410 and the sending module 1420 in FIG. 14 may be implemented by the processor 1510 controlling the transceiver 1520. For descriptions of the processor 1510 and the memory 1530, refer to the embodiment shown in FIG. 13.

Figure 16:
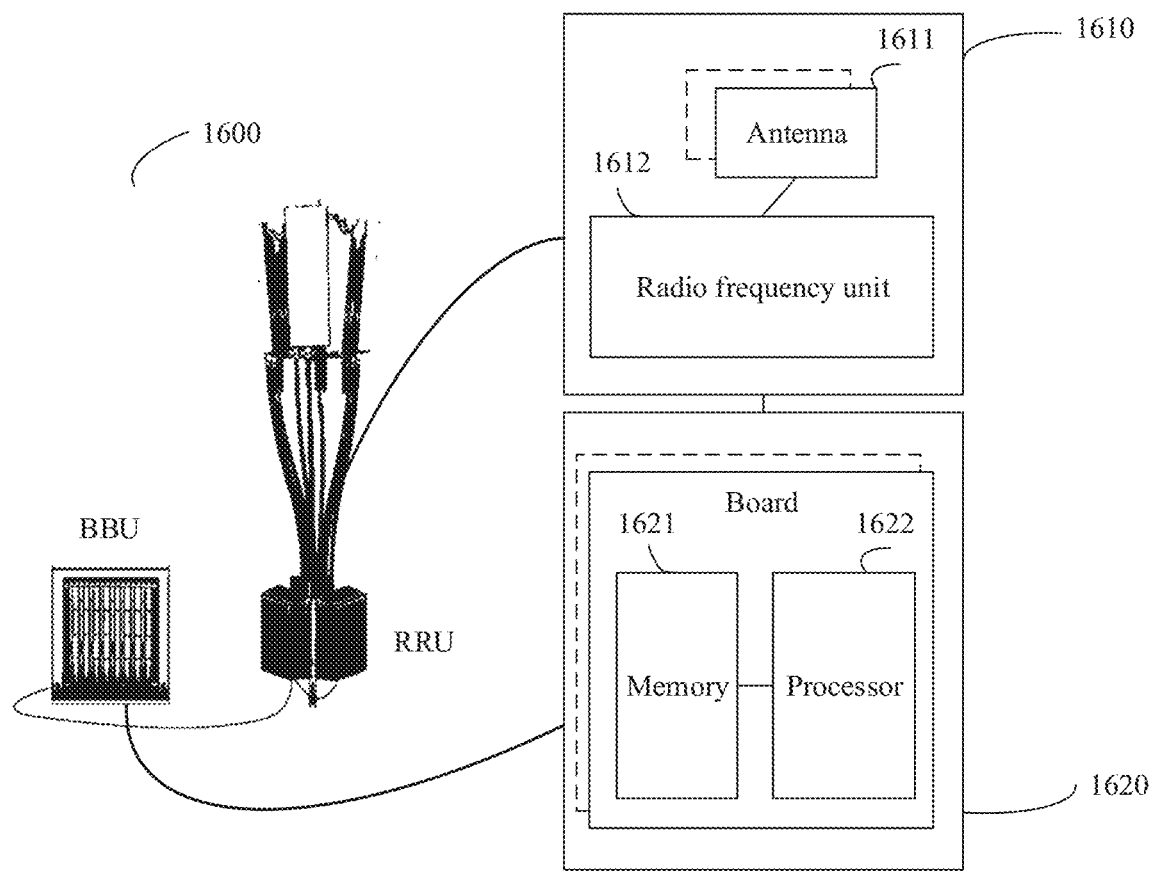
FIG. 16 is a schematic diagram of a radio access network device according to an embodiment of this application.

The communication apparatus in this embodiment is a radio access network device. The radio access network device may alternatively be shown in FIG. 16. A communication apparatus 1600 further includes one or more radio frequency units, for example, a remote radio unit (RRU) 1610 and one or more baseband units (BBUs) (which may also be referred to as digital units (DUs)) 1620. The RRU 1610 may be referred to as a transceiver module, and corresponds to the receiving module and the sending module in FIG. 14. Optionally, the transceiver module may also be referred to as a transceiver machine, a transceiver circuit, a transceiver, or the like, and may include at least one antenna 1611 and a radio frequency unit 1612. The RRU 1610 is mainly configured to: send and receive a radio frequency signal, and perform conversion between the radio frequency signal and a baseband signal. For example, the RRU 1610 is configured to send indication information to a terminal device. The BBU 1610 is mainly configured to: perform baseband processing, control a base station, and so on. The RRU 1610 and the BBU 1620 may be physically disposed together, or may be physically disposed separately, that is, in a distributed base station.

The BBU 1620 is a control center of the base station, and may also be referred to as a processing module. The BBU 1620 may correspond to the processing module 820 in FIG. 8, and is mainly configured to implement a baseband processing function such as channel coding, multiplexing, modulation, or spreading. For example, the BBU (e.g., the processing module) may be configured to control the base station to perform an operation procedure related to the radio access network device in the foregoing method embodiments, for example, to generate the foregoing indication information.

In an example, the BBU 1620 may include one or more boards, and a plurality of boards may jointly support a radio access network (for example, a long term evaluation (LTE) network) having a single access standard, or may separately support radio access networks (for example, an LTE network, a fifth generation (5G) network, or another network) having different access standards. The BBU 1620 further includes a memory 1621 and a processor 1622. The memory 1621 is configured to store necessary instructions and data. The processor 1622 is configured to control the base station to perform a necessary action, for example, configured to control the base station to perform the operation procedure related to the radio access network device in the foregoing method embodiments. The memory 1621 and the processor 1622 may serve the one or more boards. In other words, a memory and a processor may be independently disposed on each board. Alternatively, a plurality of boards may share a same memory and a same processor. In addition, a necessary circuit may be further disposed on each board.

Figure 17:
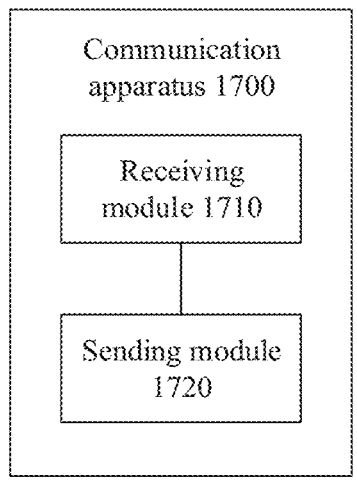
FIG. 17 is a schematic diagram of a communication apparatus according to an embodiment of this application.

FIG. 17 is a schematic diagram of a communication apparatus 1700 according to an embodiment of this application. The communication apparatus 1500 may correspond to the second node in the foregoing method embodiments. The communication apparatus 1700 includes a receiving module 1710 and a sending module 1720 that are connected to each other. The receiving module 1710 is configured to receive a notification message, where the notification message is used to notify that a first node is a relay between a second node and a terminal device. The sending module 1720 is configured to send data from the first node to the terminal device, or configured to send data from the terminal device to the first node.

In a possible embodiment, the sending module 1720 is configured to send data to the terminal device on a sidelink, where sidelink control information (SCI) corresponding to the data includes a forwarding indication.

In a possible embodiment, the SCI further includes information about a delay budget (delay budget).

Figure 18:
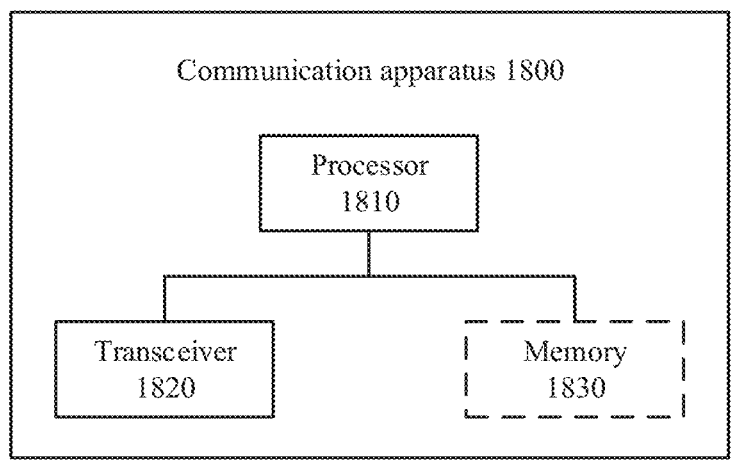
FIG. 18 is a schematic diagram of a communication apparatus according to an embodiment of this application.

FIG. 18 is a schematic diagram of a communication apparatus 1800 according to an embodiment of this application. The communication apparatus 1800 may correspond to the terminal device in the foregoing method embodiments, and may have a function of the terminal device in the foregoing method embodiments. The communication apparatus may use a hardware architecture shown in FIG. 18. The communication apparatus may include a processor 1810 and a transceiver 1820. Optionally, the communication apparatus may further include a memory 1830. The processor 1810, the transceiver 1820, and the memory 1830 communicate with each other. The receiving module 1710 and the sending module 1720 in FIG. 17 may be implemented by the processor 1810 controlling the transceiver 1820.

This application further provides a computer-readable storage medium. The computer-readable storage medium stores instructions. When the instructions are executed, the methods in the foregoing method embodiments are performed.

This application further provides a computer program product including instructions. When the instructions are executed, the methods in the foregoing method embodiments are performed.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or the functions according to the embodiments of this application are generated. The computer may be a general-purpose computer, a dedicated computer, a computer network, or another programmable communication apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, the processor may be an integrated circuit chip, and has a signal processing capability. In an implementation process, operations in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the operations, and logical block diagrams that are disclosed in the embodiments of this application. The general-purpose processor may be a microprocessor, or the processor may be any conventional processor, or the like. Operations of the methods disclosed with reference to the embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs are available, for example, a static random access memory (SRAM), a dynamic random access memory (dynamic RAM, DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following items (pieces)" or a similar expression thereof means any combination of the items, including a singular item (piece) or any combination of plural items (pieces). For example, at least one item (piece) of a, b, or c may represent: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of the present invention. Therefore, "in one embodiment" or "in an embodiment" appearing throughout the entire specification does not necessarily refer to a same embodiment. In addition, these particular features, structures, or characteristics may be combined in one or more embodiments by using any proper manner. It should be understood that sequence numbers of the foregoing processes do not mean execution sequences in the embodiments of the present invention. The execution sequences of the processes should be determined based on functions and internal logic of the processes, and should not constitute any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

It should be further understood that "first", "second", and various numerical symbols in this specification are merely used for distinguishing for ease of description, and are not used to limit a scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that units and algorithm operations in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a radio access network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The technical solutions in this application may be used in various mobile communication systems, for example, a 5th generation mobile communication (5G) system or a further developed mobile communication system.

In the embodiments of this application, sequence numbers of the processes do not mean execution sequences. The execution sequences of the processes should be determined based on functions and internal logic of the processes, and should not constitute any limitation on the implementation processes of the embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), a semiconductor medium (for example, a solid-state drive (SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. A communication method, comprising:
   receiving, by a first node, a first message of a terminal device that requests to associate the terminal device with the first node;
   obtaining, by the first node, information about a second node, wherein the second node is a group header of an upper layer group in which the terminal device is located; and
   performing, by the first node, data transmission as a relay between the terminal device and the second node.

2. The communication method according to claim 1, wherein the first message comprises information about the upper layer group in which the terminal device is located, and the obtaining, by the first node, information about the second node comprises:
   sending, by the first node, the information about the upper layer group in which the terminal device is located to an access network device; and
   receiving, by the first node, the information that is about the second node and that is sent by the access network device.

3. The communication method according to claim 1, wherein the first message comprises information about the upper layer group in which the terminal device is located, and wherein the method further comprises:
   receiving, by the first node, a correspondence between the upper layer group and the group header of the upper layer group; and
   obtaining, by the first node, the information about the second node based on the correspondence between the upper layer group and the group header of the upper layer group.

4. The communication method according to claim 1, wherein the first message comprises the information about the second node, and the obtaining, by the first node, information about the second node comprises:
   obtaining, by the first node, the information about the second node based on the first message.

5. The communication method according to claim 1, wherein the first message comprises an identifier of the terminal device, and the obtaining, by the first node, information about the second node comprises:
   sending, by the first node, the identifier of the terminal device to an access network device; and
   receiving, by the first node from the access network device, the information that is about the second node.

6. The communication method according to claim 1, wherein before the receiving, by the first node, the first message, the method further comprises:
   sending, by the first node, a notification message, wherein the notification message is a notification that the first node is a scheduling group header.

7. The communication method according to claim 1, wherein the performing, by the first node, data transmission as the relay between the terminal device and the second node comprises:
   receiving, by the first node, data from the second node, wherein sidelink control information (SCI) corresponding to the data comprises a forwarding indication; and
   sending, by the first node, the data to the terminal device.

8. A communication method, comprising:
   receiving, by a terminal device, a notification message sent by a first node that indicates that the first node is a scheduling group header;
   sending, by the terminal device, a first message to the first node that requests to associate with the first node; and performing, by the terminal device, data transmission with a second node through the first node, wherein the second node is a group header of an upper layer group in which the terminal device is located.

9. The communication method according to claim 8, wherein the notification message comprises information about the upper layer group in which the first node is located, and the sending, by the terminal device, the first message to the first node comprises:
when the upper layer group in which the first node is located is different from the upper layer group in which the terminal device is located, sending, by the terminal device, the first message to the first node.

10. The communication method according to claim 8, wherein the first message comprises information about the upper layer group in which the terminal device is located, information about the second node, or an identifier of the terminal device.

11. A communication apparatus, comprising:
a transceiver configured to receive a first message of a terminal device that requests to associate the terminal device with a first node; and
a processor configured to obtain information about a second node, wherein the second node is a group header of an upper layer group in which the terminal device is located, wherein
the transceiver is further configured to: send data from the terminal device to the second node and/or send data from the second node to the terminal device.

12. The communication apparatus according to claim 11, wherein the first message comprises information about the upper layer group in which the terminal device is located, and the transceiver is further configured to:
send the information about the upper layer group in which the terminal device is located to an access network device; and
receive the information about the second node from the access network device.

13. The communication apparatus according to claim 11, wherein the first message comprises information about the upper layer group in which the terminal device is located,
the transceiver is further configured to receive a correspondence between the upper layer group and the group header of the upper layer group; and
the processor configured to obtain the information about the second node comprises the processor further configured to obtain the information about the second node based on the correspondence between the upper layer group and the group header of the upper layer group.

14. The communication apparatus according to claim 11, wherein the first message comprises the information about the second node; and the processor is configured to obtain the information about the second node comprises the processor further configured to obtain the information about the second node based on the first message.

15. The communication apparatus according to claim 11, wherein the first message comprises an identifier of the terminal device, and the transceiver is further configured to:
send the identifier of the terminal device to an access network device; and
receive, from the access network device, the information that is about the second node.

16. The communication apparatus according to claim 11, wherein the transceiver is further configured to send a notification message, wherein the notification message is a notification that the communication apparatus is a scheduling group header.

17. The communication apparatus according to claim 11, wherein sidelink control information (SCI) corresponding to the data comprises a forwarding indication.

18. A terminal device, comprising:
a processor; and
a transceiver coupled with the processor, the transceiver configured to:
receive a notification message sent by a first node that indicates that the first node is a scheduling group header,
send a first message to the first node that requests to associate with the first node, and
receive data from a second node through the first node, and/or send data to the second node through the first node, wherein the second node is a group header of an upper layer group in which the terminal device is located.

19. The terminal device according to claim 18, wherein the notification message comprises information about the upper layer group in which the first node is located, and the transceiver is further configured to:
when the upper layer group in which the first node is located is different from the upper layer group in which the terminal device is located, send the first message to the first node.

20. The terminal device according to claim 18, wherein the first message comprises information about the upper layer group in which the terminal device is located, information about the second node, or an identifier of the terminal device.

* * * * *